US012729168B2

(12) United States Patent
Shi et al.

(10) Patent No.: US 12,729,168 B2
(45) Date of Patent: Sep. 8, 2026

(54) POLYMERIC SALT-TOLERANT AND WATER-RETAINING FERTILIZER AND PREPARATION METHOD THEREOF

(71) Applicant: Qingdao Agricultural University, Qingdao (CN)

(72) Inventors: Yan Shi, Qingdao (CN); Yu Gao, Qingdao (CN); Wenqin Cao, Qingdao (CN)

(73) Assignee: QINGDAO AGRICULTURAL UNIVERSITY, Shandong (CN)

( * ) Notice: Subject to any disclaimer, the term of this patent is extended or adjusted under 35 U.S.C. 154(b) by 587 days.

(21) Appl. No.: 18/355,012

(22) Filed: Jul. 19, 2023

(65) Prior Publication Data

US 2024/0034695 A1 Feb. 1, 2024

Related U.S. Application Data

(63) Continuation of application No. PCT/CN2022/113001, filed on Aug. 17, 2022.

(30) Foreign Application Priority Data

Jul. 29, 2022 (CN) ........................ 202210904227.3

(51) Int. Cl.
*C05G 3/00* (2020.01)
*C05B 7/00* (2006.01)
*C05G 5/12* (2020.01)

(52) U.S. Cl.
CPC .................. *C05G 3/00* (2013.01); *C05B 7/00* (2013.01); *C05G 5/12* (2020.02)

(58) Field of Classification Search
CPC ................ C05G 3/00; C05G 5/12; C05B 7/00
See application file for complete search history.

(56) References Cited

U.S. PATENT DOCUMENTS 5,209,768 A * 5/1993 Hughes .................... C05G 5/40 504/366
10,865,161 B2 * 12/2020 Liu ...................... C08F 292/00

FOREIGN PATENT DOCUMENTS

CN 102585099 A 7/2012
CN 104446913 A * 3/2015 ............... C05G 5/30
(Continued)

OTHER PUBLICATIONS

Chen et al., "Synthesis and performance of anti-salt water retention agent," China Academic Journal Electronic Publishing House, Chemical Industry and Engineering Progress, vol. 34, Issue 6, 2015, 6 pages.

(Continued)

*Primary Examiner* — Wayne A Langel
(74) *Attorney, Agent, or Firm* — Leong C. Lei

(57) ABSTRACT

Provided are a polymeric salt-tolerant and water-retaining fertilizer and a preparation method thereof, belonging to the technical field of fertilizers, and including the following raw materials: fertilizer, water-retaining agent and clay; the water-retaining agents includes the following raw materials: polyacrylamide, methylallyl polyoxyethylene ether, 2-acrylamide-2-methylpropanesulfonic acid, carboxymethyl cellulose, ammonium persulfate, N, N'-methylene bisacrylamide, montmorillonite and kaolin. The application also discloses the following preparation method: (1) mixing biochar and fertilizer in water to obtain a mixture A; (2) preparing soil colloid; (3) preparing a dispersion; and (4) mixing the raw materials, granulating, and drying to obtain the polymeric salt-tolerant and water-retaining fertilizer.

10 Claims, 1 Drawing Sheet

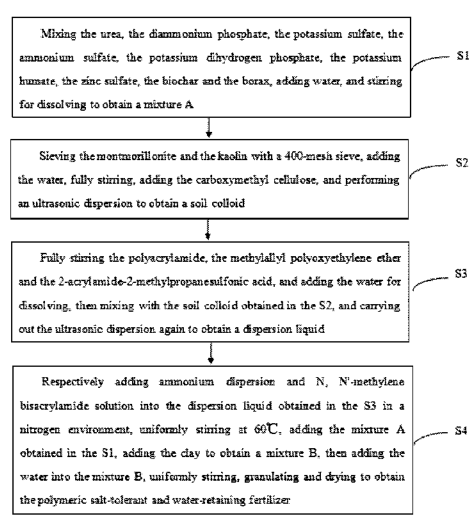

(56) References Cited

FOREIGN PATENT DOCUMENTS

| | | | | | |
|---|---|---|---|---|---|
| CN | 105948891 | A | | 9/2016 | |
| CN | 106083447 | A | * | 11/2016 | ............... C05B 7/00 |
| CN | 106396973 | A | * | 2/2017 | ............... C05G 3/00 |
| CN | 107673927 | A | * | 2/2018 | ............... C05B 7/00 |
| CN | 108559516 | A | * | 9/2018 | ............. C09K 17/40 |
| CN | 111908974 | A | | 11/2020 | |
| CN | 112194539 | A | | 1/2021 | |
| CN | 114524910 | A | | 5/2022 | |
| DE | 4029591 | A1 | | 3/1992 | |
| EP | 0586911 | A1 | * | 3/1994 | ............... C05G 3/00 |

OTHER PUBLICATIONS

Qiu et al., “Effects of superabsorbents containing montmorillonite and polysaccharide on soil physical properties,” China Academic Journal Electronic Publishing House, China Soil and Fertilizer 2013 (6), doi: 10. 11838 /sfsc. 20130603, 6 pages.

Chinese Office Action received in CN Application No. 202210904227.3 mailed Feb. 2, 2023.

International Search Report received in PCT Application No. PCT/CN2022/113001 mailed Dec. 16, 2022.

* cited by examiner

Mixing the urea, the diammonium phosphate, the potassium sulfate, the ammonium sulfate, the potassium dihydrogen phosphate, the potassium humate, the zinc sulfate, the biochar and the borax, adding water, and stirring for dissolving to obtain a mixture A

S1

Sieving the montmorillonite and the kaolin with a 400-mesh sieve, adding the water, fully stirring, adding the carboxymethyl cellulose, and performing an ultrasonic dispersion to obtain a soil colloid

S2

Fully stirring the polyacrylamide, the methylallyl polyoxyethylene ether and the 2-acrylamide-2-methylpropanesulfonic acid, and adding the water for dissolving, then mixing with the soil colloid obtained in the S2, and carrying out the ultrasonic dispersion again to obtain a dispersion liquid

S3

Respectively adding ammonium dispersion and N, N'-methylene bisacrylamide solution into the dispersion liquid obtained in the S3 in a nitrogen environment, uniformly stirring at 60℃, adding the mixture A obtained in the S1, adding the clay to obtain a mixture B, then adding the water into the mixture B, uniformly stirring, granulating and drying to obtain the polymeric salt-tolerant and water-retaining fertilizer

S4

POLYMERIC SALT-TOLERANT AND WATER-RETAINING FERTILIZER AND PREPARATION METHOD THEREOF

CROSS-REFERENCE TO RELATED APPLICATIONS

This application is a continuation of PCT/CN2022/113001, filed on Aug. 17, 2022, and claims priority to Chinese Patent Application No. 202210904227.3, filed on Jul. 29, 2022, the entire contents of these applications are incorporated herein by reference.

TECHNICAL FIELD

The application relates to the field of fertilizers, and in particular to a polymeric salt-tolerant and water-retaining fertilizer and a preparation method thereof.

BACKGROUND

At present, the research and application of water-retaining fertilizers in China are developed rapidly, and the market demand is great, but the production capacity is very small, and the products produced have few functions and low performance, which is manifested in the high prices of farmland application, easy moisture absorption and difficult mechanized use. Therefore, it is urgent to create a production process and product of polymeric salt-tolerant and water-retaining fertilizer with good performance and multiple functions.

In the prior art, the water-retaining fertilizer has the problems of small production capacity, few functions and low performance, high application costs in farmlands, easy moisture absorption and difficult mechanical use. Moreover, the production technology of water-retaining agent in China is quite singular. Due to the limited choices of raw materials, the inorganic chemical water-retaining agent represented by polyacrylate is limited by chemical raw materials such as acrylic acid, which has high production costs, singular functions and high prices. Most water-retaining agents are only centered on the water-retaining properties, lack of salt tolerance and the interaction with fertilizers. One of the main raw materials of the water-retaining agent is polyacrylamide, which is hygroscopic and easy to absorb moisture in the air, resulting in poor product properties.

Therefore, how to provide a water-retaining fertilizer with good water-retaining performance, strong salt tolerance and low costs is an urgent technical problem for skilled people in this field.

SUMMARY

The objective of the application is to provide a polymeric salt-tolerant and water-retaining fertilizer with salt tolerance, water retention, high fertilizer efficiency and soil improvement effects and a preparation method thereof, so as to solve the problems existing in the prior art.

In order to achieve the above-mentioned objectives, the present application provides the following scheme.

A polymeric salt-tolerant and water-retaining fertilizer includes the following raw materials in parts by weight:

4465-5880 parts of fertilizers, 2292-3563 parts of water-retaining agents and 850-2850 parts of clays;

the water-retaining agent includes following raw materials in parts by weight:

1000-1500 parts of polyacrylamide, 400-600 parts of methylallyl polyoxyethylene ether, 300-450 parts of 2-acrylamide-2-methylpropanesulfonic acid, 100-200 parts of carboxymethyl cellulose, 40-60 parts of ammonium persulfate, 2-3 parts of N, N'-methylene bisacrylamide, 300-500 parts of montmorillonite and 150-250 parts of kaolin.

Optionally, the fertilizer includes the following raw materials in parts by weight:

1000-1200 parts of urea, 800-1000 parts of diammonium phosphate, 500-700 parts of potassium sulfate, 1000-1200 parts of ammonium sulfate, 350-500 parts of potassium dihydrogen phosphate, 500-750 parts of potassium humate, 5-10 parts of zinc sulfate, 300-500 parts of biochar and 10-20 parts of borax.

The application has the following beneficial effects: firstly, the biochar in the application has a microporous structure, and the application of biochar is beneficial to increase capillary porosity, soil total porosity and aeration porosity, effectively control the soil moisture evaporation, and improve the soil effective water content and the field water capacity. As a biomaterial matrix, biochar has the characteristics of biodegradcapacity and low cost. The addition of the biochar in the application may greatly reduce the production cost of water-retaining blended fertilizer, increase the initial performance, improve the soil aggregate structure and promote the adsorption and maintenance of soil nutrients.

Meanwhile, the polyacrylamide used in the application has amide groups, and 2-acrylamide-2-methylpropanesulfonic acid has sulfonic acid groups and amide groups. With the increase of the dosage, the sulfonic acid groups in the product increase the number of anions in the polyacrylamide network structure, increase the osmotic pressure inside and outside the network, and increase the water absorption multiplication of the water-retaining agent. With the addition of amide group, there is a nonionic strong hydrophilic group -CONH2 on the network structure chain, which is little ionized in water and little influenced by electrolyte, thus enhancing the salt tolerance of the product.

In addition, the molecular structure of the methylallyl polyoxyethylene ether in the application has a chain structure and certain flexibility, which may increase the swelling capacity of the polymer, and because the methylallyl polyoxyethylene ether has ether bonds and terminal hydroxyl groups, the salt tolerance of the water-retaining agent may be enhanced. Montmorillonite and kaolin have strong adsorption capacity, which may improve the mechanical strength and water-retaining capacity of water-retaining fertilizer.

Furthermore, the clay in the application, as a small-particle aluminum silicate, may form chelates with water-retaining agent polyacrylamide and other fertilizers, so that on the one hand, the dispersibility of all raw materials in the polymeric water-retaining salt-tolerant fertilizer is improved, the uniform granulation of the fertilizer is ensured, and other irregular shapes such as fertilizer polygons are avoided; on the other hand, the formation of chelates makes it difficult for polyacrylamide to absorb the moisture in the air, which reduces the moisture absorption rate of fertilizer in the air, so that the polymeric water-retaining and salt-tolerant fertilizer provided by the application is able to be successfully applicable to mechanized fertilization.

In the application, the clay, the polyacrylamide and fertilizers with various nutrient elements are mixed and granulated, so that the direct contact area between potash fertilizer and soil may be reduced, the organic matter around potash fertilizer may be increased, the fixation of potassium element by soil may be reduced, and ions or active groups on the surface of soil particles interact with each other, and the adsorption of nutrients such as nitrogen, phosphorus and potassium may be increased to inhibit the loss by forming a stable granular structure.

A preparation method of polymeric salt-tolerant and water-retaining fertilizer includes the following steps:

- S1, mixing the urea, the diammonium phosphate, the potassium sulfate, the ammonium sulfate, the potassium dihydrogen phosphate, the potassium humate, the zinc sulfate, the biochar and the borax, adding water, and stirring to dissolve to obtain a mixture A;
- S2, sieving the montmorillonite and the kaolin with 400-mesh sieve, adding the water, fully stirring, adding the carboxymethyl cellulose, and performing an ultrasonic dispersion to obtain a soil colloid;
- S3, fully stirring the polyacrylamide, the methylallyl polyoxyethylene ether and the 2-acrylamide-2-methylpropanesulfonic acid, and adding the water for dissolving, then mixed with the soil colloid obtained in the S2, and carrying out the ultrasonic dispersion again to obtain a dispersion liquid; and
- S4, respectively adding ammonium dispersion and N, N'-methylene bisacrylamide solution into the dispersion liquid obtained in the S3 in a nitrogen environment, uniformly stirring at 60° C., adding the mixture A obtained in the S1, adding the clay to obtain a mixture B, then adding the water into the mixture B, uniformly stirring, granulating and drying to obtain the polymeric salt-tolerant and water-retaining fertilizer.

The application has the advantages that the fertilizer is prepared separately, and montmorillonite and kaolin are the inorganic components in the water-retaining agent, accounting for about 20% of the whole materials of the water-retaining agent, so that the water absorption and swelling capacity of the water-retaining agent may be greatly improved, and the soil colloid may be prepared separately, which is convenient for carboxymethyl cellulose to perform modification and improve the water-retaining performance;

The olyacrylamide, the methylallyl polyoxyethylene ether and the 2-acrylamide-2-methylpropanesulfonic acid are the organic components and the main parts of the water-retaining agent. The presence of the amide groups, the ether bonds and the sulfonic acid groups may improve the water absorption and swelling capacity of water-retaining agent and enhance the salt tolerance of water-retaining agent.

As an initiator, the ammonium persulfate is able to copolymerize the polyacrylamide, the methylallyl polyoxyethylene ether, the 2-acrylamide-2-methylpropanesulfonic acid, the montmorillonite and the kaolin. The proper concentration of N, N'-methylene bisacrylamide may make the water-retaining agent form a suitable three-dimensional network structure and improve the water-retaining performance. Under the nitrogen environment, the oxygen in the solution is discharged to avoid the interference in the polymerization process.

Optionally, a mass ratio of a total amount of the urea, the diammonium phosphate, the potassium sulfate, the ammonium sulfate, the potassium dihydrogen phosphate, the potassium humate, the zinc sulfate, the biochar and the borax to the water in the S1 is 1: (1.5-2).

The beneficial effects are as follows: the urea, the diammonium phosphate, the potassium sulfate, the ammonium sulfate and the potassium dihydrogen phosphate provide the basic nitrogen, phosphorus and potassium nutrients for crops; the potassium humate may improve the utilization efficiency of potassium; the zinc sulfate may improve the activity of carbonic anhydrase, the photosynthesis capacity of crops and the stress resistance of crops; and the fertilizers above-mentioned may improve the soil aggregate structure, promote the adsorption and maintenance of soil nutrients, and meanwhile, the borax may promote the reproductive growth of crops.

Optionally, a mass ratio of the montmorillonite and the kaolin in the S2 is 2:1, and a mass ratio of a total amount of the montmorillonite and the kaolin to the water is 1: (6-9).

The beneficial effects are as follows: the montmorillonite is composed of two layers of oxygen silicon tetrahedron and one layer of alumina octahedron sheet, and has good swelling and water absorption characteristics; the kaolin is a clay with kaolinite as the main component, which has high plasticity and bonding performance and good dispersibility in water; the mass ratio of montmorillonite and kaolin added in the application is 2:1, and the mixed addition has a certain synergistic effect, which may improve the swelling performance of polymers.

Optionally, a mass ratio of the polyacrylamide, the methylallyl polyoxyethylene ether and the 2-acrylamide-2-methylpropanesulfonic acid in the S3 is 10:4:3, and a mass ratio of a total amount of the polyacrylamide, the methylallyl polyoxyethylene ether and the 2-acrylamide-2-methylpropanesulfonic acid to the water is 1: (6-9).

The beneficial effects are as follows: when the mass ratio of the polyacrylamide, the methylallyl polyoxyethylene ether and the 2-acrylamide-2-methylpropanesulfonic acid is 10:4:3, the water-retaining agent has strong salt tolerance and strong water absorption and swelling capacity in saline-alkali environment.

Optionally, a mass ratio of the ammonium persulfate to the water in the ammonium dispersion in the S4 is 1: (6-9).

In the N, N'-methylene bisacrylamide solution, the mass ratio of N, N'-methylene bisacrylamide to the water is 1: (6-9).

The beneficial effects are as follows: the ammonium persulfate is used as an initiator, and N, N'-methylene bisacrylamide is used as a crosslinking agent. Under the concentration range, the polymeric salt-tolerant and water-retaining fertilizer has good water absorption multiple. If the amount of the crosslinking agent is low, the network degree of hydrogel in the polymer is too low to form a three-dimensional network. However, when the concentration of the crosslinking agent is too high, the network degree of the polymer hydrogel is high, and the three-dimensional network density is too high, which reduces the water absorption capacity of the polymer.

Optionally, a mass ratio of the mixture B to water in the S4 is 1: (1-3).

The beneficial effects are as follows: when the mass ratio of the mixture B to the water is too low, it is difficult for mixture B to disperse evenly; when the mass ratio is too high, more energy will be consumed during the granulation and drying, so this mass ratio range is suitable.

Optionally, a particle size of the granulation in the S4 is 4-6 millimeters.

The particle size less than 4 millimeters will shorten the fertilizer efficiency and cause the loss of fertility, while the particle size greater than 6 millimeters will not be conducive to mechanized fertilization.

Optionally, the drying in the S4 is a microwave drying; a microwave power is 75-90 kilowatts; a drying temperature is 105-130° C.; and a drying duration is 15-25 minutes.

The beneficial effects are as follows: under the microwave power, temperature and time, the fertilizer is dried evenly, too low power and temperature will prolong the drying duration, and too high power and temperature will easily lead to uneven drying.

The application discloses a polymeric salt-tolerant and water-retaining fertilizer and a preparation method thereof. The polymeric salt-tolerant and water-retaining fertilizer prepared by the application is formed by mixing the clay, the polyacrylamide, the methylallyl polyoxyethylene ether, the 2-acrylamide-2-methylpropanesulfonic acid, the montmorillonite, the kaolin and a plurality of nutrient element fertilizers through the granulating, thus forming a multifunctional fertilizer with good salt tolerance, water-retaining function, fertilizer efficiency and soil improvement function. The polymeric salt-tolerant and water-retaining fertilizer is safe and environment-friendly, nontoxic and odorless, does not pollute plants, soil, groundwater, etc., and has no residual organic and inorganic harmful substances, and is suitable for mechanized fertilization, saline-alkali land, and various crops and soils. The polymeric salt-tolerant and water-retaining fertilizer has the functions of repeatedly absorbing, storing and slowly releasing fertilizer and water during drought, and may enhance the drought resistance of crops, achieve coordinated nutrient balance, improve the utilization efficiency of fertilizer and water, and significantly increase the crop yield.

BRIEF DESCRIPTION OF THE DRAWING

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without paying creative labor.

FIG. 1 is a flow chart of a preparation method of a polymeric salt-tolerant and water-retaining fertilizer provided by the present application.

DETAILED DESCRIPTION OF THE EMBODIMENTS

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor fall in the scope of protection of the present application.

As shown in FIG. 1, the present application provides a preparation method of polymeric salt-tolerant and water-retaining fertilizer, and the method includes the following steps:

S1, mixing the urea, the diammonium phosphate, the potassium sulfate, the ammonium sulfate, the potassium dihydrogen phosphate, the potassium humate, the zinc sulfate, the biochar and the borax, adding water, and stirring to dissolve to obtain a mixture A;

S2, sieving the montmorillonite and the kaolin with 400-mesh sieve, adding the water, fully stirring, adding the carboxymethyl cellulose, and performing an ultrasonic dispersion to obtain a soil colloid;

S3, fully stirring the polyacrylamide, the methylallyl polyoxyethylene ether and the 2-acrylamide-2-methylpropanesulfonic acid, and adding the water for dissolving, then mixed with the soil colloid obtained in the S2, and carrying out the ultrasonic dispersion again to obtain a dispersion liquid; and S4, respectively adding ammonium dispersion and N, N'-methylene bisacrylamide solution into the dispersion liquid obtained in the S3 in a nitrogen environment, uniformly stirring at 60° C., adding the mixture A obtained in the S1, adding the clay to obtain a mixture B, then adding the water into the mixture B, uniformly stirring, granulating and drying to obtain the polymeric salt-tolerant and water-retaining fertilizer.

In order to make the above-mentioned objectives, features and advantages of the present application more obvious and easier to understand, the present application will be further described in detail with the attached drawings and specific embodiments.

Embodiment 1

A preparation method of the polymeric salt-tolerant and water-retaining fertilizer, specifically includes the following steps:

(1) Preparing a fertilizer solution 100 kg of the production, 12 kg of the urea, 9 kg of the diammonium phosphate, 6 kg of the potassium sulfate, 10 kg of the ammonium sulfate, 4 kg of the potassium dihydrogen phosphate, 6 kg of the potassium humate, 4 kg of the biochar, 0.1 kg of the borax and 0.1 kg of the zinc sulfate are mixed and added into a neutralization kettle, then the water is added according to the mass ratio of the total weight of the above-mentioned substances to the water of 1:1.5 for fully stirring and dissolving to obtain a fertilizer mixture A.

(2) The montmorillonite and kaolin are screened through a 400-mesh sieve, then 3 kg of the screened montmorillonite and 1.5 kg of kaolin are weighed, and the water with the mass ratio of the total weight of the above-mentioned substances to the water of 1:7 is added for fully stirring; then 1 kg of carboxymethyl cellulose is added, and the ultrasonic dispersion is carried out to obtain the soil colloid.

(3) 10 kg of the polyacrylamide, 4 kg of the methylallyl polyoxyethylene ether and 3 kg of the 2-acrylamide-2-methylpropanesulfonic acid are taken, and the water is added into a container according to the mass ratio of the total weight of the above-mentioned substances to water of 1:7 for fully stirring and dissolving to obtain a solution A containing the above-mentioned three substances.

(4) The solution A and the soil colloid obtained in the step (2) are mixed, and the ultrasonic dispersion is performed again to obtain a dispersion.

(5) 0.4 kg of the ammonium persulfate and 0.02 kg of the N, N'-methylene bisacrylamide are respectively put into two containers, then the water is respectively added into the containers according to the mass ratio of each substance to water of 1:7 for fully stirring to obtain the ammonium dispersion and the N, N'-methylene bisacrylamide solution, and the ammonium dispersion and the N, N'-methylene bisacrylamide solution are respectively added into the dispersion in the nitrogen environment, and uniformly stirred at 60° C., and then the mixture A obtained in the step (1) is added, followed by stirring uniformly again to obtain a mixture B.

(6) Adding clay 25.88 kg of the clay is added to the mixture B obtained in the step (5) to obtain a mixture C, and then water is added to the mixture C according to the mass ratio of the mixture C to the water of 1:2 for fully stirring and dissolving, so as to obtain a mixture D in which polyacrylamide is uniformly coated by a compound mud fertilizer.

(7) Granulating and drying

The mixture D is sent to a granulator for granulation, and then screened by a screening machine to obtain particles with a particle size of 4-6 millimeters, and then the particles are sent to a microwave dryer with a microwave power of 80 kilowatts and dried at a temperature of 110° C. for 15-25 minutes to obtain the polymeric salt-tolerant and water-retaining fertilizer.

The above-mentioned polymeric salt-tolerant and water-retaining fertilizer is tested for corn growth and development, and the equivalent common blended fertilizer ($N—P_2O_5—K_2O$ is 24-13-6, and the total nutrient content is ≥55%) produced by regular manufacturers in the market is selected as the control treatment. The experimental site is the experimental base of Qingdao Agricultural University (N37° 0'27.24", E119° 22'15.79"), where the organic matter content is 0.71%, the pH is 8.16, the salt content is 3.02 g/kg, the alkali-hydrolyzable nitrogen content is 162.03 mg/kg, and the available phosphorus content is 14.1 mg/kg, and the available potassium content is 313 mg/kg. Denghai 605, a corn variety, is selected as the experimental material. Two groups of treatments are set up, CK (equivalent common blended fertilizer) is 50 kg/667m$^2$, T1 (polymeric water-retaining and salt-tolerant fertilizer) is 21.3 kg/667m$^2$, and the plot area is 45 m$^2$, which is repeated for three times. All fertilizers were applied as base fertilizer at one time. Soil water content and chlorophyll content were measured on September 5, September 16 and Sep. 27, 2021 respectively. Corn yield was measured on October 2nd. The soil moisture content is measured by drying method by drilling 0-40 cm soil sample with soil; the chlorophyll content is determined by SPAD-502 chlorophyll meter.

TABLE 1

Soil water content of corn under different treatments (%)

| Treat- | September 5 | | September 16 | | September 27 | |
|---|---|---|---|---|---|---|
| ment | 0-20 cm | 20-40 cm | 0-20 cm | 20-40 cm | 0-20 cm | 20-40 cm |
| CK | 7.51 | 7.85 | 5.98 | 6.35 | 7.36 | 9.69 |
| T1 | 8.62 | 8.93 | 8.23 | 8.36 | 8.96 | 10.86 |

From Table 1, it can be seen that under the same cost, using the polymeric water-retaining and salt-tolerant fertilizer may maintain higher soil moisture content than using the common blended fertilizer, which is beneficial to corn growth.

TABLE 2

Chlorophyll content (SPAD value) of corn leaves under different treatments

| Treatment | September 5 | September 16 | September 27 |
|---|---|---|---|
| CK | 40.9 | 33.9 | 21.6 |
| T1 | 57.6 | 51.3 | 42.6 |

From Table 2, it can be seen that under the same cost, using the polymeric water-retaining and salt-tolerant fertilizer may maintain higher chlorophyll content of leaves than using the common blended fertilizer, which is beneficial to the photosynthesis and nutrient accumulation of the corns.

TABLE 3

Components and yield of corns under different treatments

| Treatment | Panicle number (plant/667 m$^2$) | Number of grains per panicle (piece/panicle) | Thousand seed weight (g) | Yield (kg/667 m$^2$) |
|---|---|---|---|---|
| CK | 4259 | 489 | 342.86 | 606.95 |
| T1 | 4256 | 524 | 351.33 | 665.99 |

From the final yield results, the number of grains per panicle and thousand seed weight of the corns treated with the polymeric water-retaining and salt-tolerant fertilizer are higher than those treated with the common blended fertilizer. The yield of corns treated with the polymeric water-retaining and salt-tolerant fertilizer is 589.20 kg/667m$^2$, and the control yield using the common blended fertilizer is 539.40 kg/667m$^2$, so the polymeric water-retaining and salt-tolerant fertilizer provided by the application is able to promote the high yield.

Embodiment 2

A preparation method of a polymeric salt-tolerant and water-retaining fertilizer specifically includes the following steps:

(1) Preparing a fertilizer solution

According to 100 kg of the production, 12 kg of the urea, 10 kg of the diammonium phosphate, 7 kg of the potassium sulfate, 12 kg of the ammonium sulfate, 5 kg of the potassium dihydrogen phosphate, 7.5 kg of the potassium humate, 0.1 kg of the zinc sulfate, 5 kg of the biochar and 0.1 kg of the borax are mixed and added into a neutralization kettle, then the water is added according to the mass ratio of the total weight of the above-mentioned substances to the water of 1:1.6 for fully stirring and dissolving to obtain a fertilizer mixture A.

(2) The montmorillonite and kaolin screened through a 400-mesh sieve, then 4 kg of the screened montmorillonite and 1.5 kg of kaolin are weighed, and the water with the mass ratio of the total weight of the above-mentioned substances to the water of 1:7 is added for fully stirring; then 1.2 kg of carboxymethyl cellulose is added, and the ultrasonic dispersion is carried out to obtain the soil colloid.

(3) 11 kg of the polyacrylamide, 4.5 kg of the methylallyl polyoxyethylene ether and 3.3 kg of the 2-acrylamide-2-methylpropanesulfonic acid are taken, and the water is added into a container according to the mass ratio of the total weight of the above-mentioned substances to water of 1:7 for fully stirring and dissolving to obtain a solution A containing the above-mentioned three substances.

(4) The solution A and the soil colloid obtained in the step (2) are mixed, and the ultrasonic dispersion is performed again to obtain a dispersion.

(5) 0.5 kg of the ammonium persulfate and 0.02 kg of the N, N'-methylene bisacrylamide are respectively put into two containers, then the water is respectively added into the containers according to the mass ratio of each substance to water of 1:7 for fully stirring to obtain the ammonium dispersion and the N, N'-methylene bisacrylamide solution, and the ammonium dispersion and the N, N'-methylene bisacrylamide solution are respectively added into the dispersion in the nitrogen environment, and uniformly stirred at 60° C., and then the mixture A obtained in the step (1) is added, followed by stirring uniformly again to obtain a mixture B.

(6) Adding clay 15.28 kg of the clay is added to the mixture B obtained in the step (5) to obtain a mixture C, and then water is added to the mixture C according to the mass ratio of the mixture C to the water of 1:2 for fully stirring and dissolving, so as to obtain a mixture D in which polyacrylamide is uniformly coated by a compound mud fertilizer.

(7) Granulating and drying

The mixture D is sent to a granulator for granulation, and then screened by a screening machine to obtain particles with a particle size of 4-6 millimeters, and then the particles are sent to a microwave dryer with a microwave power of 80 kilowatts and dried at a temperature of 120° C. for 15-25 minutes to obtain the polymeric salt-tolerant and water-retaining fertilizer.

The above-mentioned polymeric salt-tolerant and water-retaining fertilizer is tested for peanut growth and development, and the equivalent common blended fertilizer (N—$P_2O_5$—$K_2O$ is 24-13-6, and the total nutrient content is ≥55%) produced by regular manufacturers in the market is selected as the control treatment. The experimental site is the experimental base of Qingdao Agricultural University (N37° 0'27.24", E119° 22'15.79"), where the organic matter content is 0.64%, the pH is 8.09, the salt content is 3.22 g/kg, the alkali-hydrolyzable nitrogen content is 135.05 mg/kg, and the available phosphorus content is 15.3 mg/kg, and the available potassium content is 296 mg/kg. Huayu 60, a peanut variety, is selected as the experimental material. Two groups of treatments are set up, CK (equivalent common blended fertilizer) is 48.6 kg/667m$^2$, T1 (polymeric water-retaining and salt-tolerant fertilizer) is 20.2 kg/667m$^2$, and the plot area is 45 m$^2$, which is repeated for three times. All fertilizers were applied as base fertilizer at one time. Soil water content and chlorophyll content were measured on September 5, September 16 and Sep. 27, 2021 respectively. Peanut yield was measured on September 27. The soil moisture content is measured by drying method by drilling 0-40 cm soil sample with soil; the chlorophyll content is determined by SPAD-502 chlorophyll meter.

TABLE 4

Soil moisture content of peanuts under different treatments

| Treat- | September 5 | | September 16 | | September 27 | |
|---|---|---|---|---|---|---|
| ment | 0-20 cm | 20-40 cm | 0-20 cm | 20-40 cm | 0-20 cm | 20-40 cm |
| CK | 6.21 | 7.15 | 6.18 | 6.55 | 5.86 | 6.24 |
| T1 | 7.63 | 8.23 | 7.23 | 7.86 | 7.03 | 8.03 |

From Table 4, it can be seen that under the same cost, using the polymeric water-retaining and salt-tolerant fertilizer may maintain higher soil moisture content than using the common blended fertilizer, which is beneficial to the peanut growth.

TABLE 5 chlorophyll content (SPAD value) of peanut leaves under different treatments

| | September 5 | September 16 | September 27 |
|---|---|---|---|
| Control | 32.6 | 25.3 | 18.7 |
| Treatment | 39.8 | 34.9 | 29.8 |

From Table 5, it can be seen that under the same cost, using the polymeric water-retaining and salt-tolerant fertilizer may maintain higher chlorophyll content of leaves than using the common blended fertilizer, which is beneficial to the peanut growth.

TABLE 6

Components and yield of peanut under different treatments

| Treat-ment | Number of plants per unit area (Plant/ 667 m$^2$) | Fruit number per plant (individual/ plant) | Fruit weight (g) | Kernel weight (g) | Kernel yield | Yield (kg/ 667 m$^2$) |
|---|---|---|---|---|---|---|
| CK | 9526 | 16.32 | 232.87 | 97.83 | 70.16% | 307.73 |
| T1 | 9531 | 16.78 | 234.88 | 101.32 | 70.53% | 319.30 |

From the final yield results, the fruit number per plant, fruit weight, kernel weight and kernel yield of the peanuts treated with the polymeric water-retaining and salt-tolerant fertilizer are all higher than those of the common blended fertilizer (CK). The yield of peanut using polymeric water-retaining and salt-tolerant fertilizer is 319.30 kg/667m$^2$, which is 3.76% higher than that using common blended fertilizer, so the polymeric water-retaining and salt-tolerant fertilizer provided by the application is able to promote the high yield.

Embodiment 3

A preparation method of the polymeric salt-tolerant and water-retaining fertilizer, as shown in FIG. 1 specifically includes the following steps:

(1) Preparing a fertilizer solution

According to 100 kg of the production, 11 kg of the urea, 9 kg of the diammonium phosphate, 6 kg of the potassium sulfate, 11 kg of the ammonium sulfate, 4.5 kg of the potassium dihydrogen phosphate, 6 kg of the potassium humate, 4 kg of the biochar, 0.15 kg of the borax and 0.08 kg of the zinc sulfate are mixed and added into a neutralization kettle, then the water is added according to the mass ratio of the total weight of the above-mentioned substances to the water of 1:1.5 for fully stirring and dissolving to obtain a fertilizer mixture A.

(2) The montmorillonite and kaolin screened through a 400-mesh sieve, then 4 kg of the screened montmorillonite and 2 kg of kaolin are weighed, and the water with the mass ratio of the total weight of the above-mentioned substances to the water of 1:7 is added for fully stirring; then 1 kg of carboxymethyl cellulose is added, and the ultrasonic dispersion is carried out to obtain the soil colloid.

(3) 11 kg of the polyacrylamide, 4.4 kg of the methylallyl polyoxyethylene ether and 3.3 kg of the 2-acrylamide-2-methylpropanesulfonic acid are taken, and the water is added into a container according to the mass ratio of the total weight of the above-mentioned substances to water of 1:7 for fully stirring and dissolving to obtain a solution A containing the above-mentioned three substances.

(4) The solution A and the soil colloid obtained in the step (2) are mixed, and the ultrasonic dispersion is performed again to obtain a dispersion.

(5) 0.5 kg of the ammonium persulfate and 0.025 kg of the N, N'-methylene bisacrylamide are respectively put into two containers, then the water is respectively added into the containers according to the mass ratio of each substance to water of 1:7 for fully stirring to obtain the ammonium dispersion and the N, N'-methylene bisacrylamide solution, and the ammonium dispersion and the N, N'-methylene bisacrylamide solution are respectively added into the dispersion in the nitrogen environment, and uniformly stirred at 60° C., and then the mixture A obtained in the step (1) is added, followed by stirring uniformly again to obtain a mixture B.

(6) Adding clay 21.945 kg of the clay is added to the mixture B obtained in the step (5) to obtain a mixture C, and then water is added to the mixture C according to the mass ratio of the mixture C to the water of 1:2 for fully stirring and dissolving, so as to obtain a mixture D in which polyacrylamide is uniformly coated by a compound mud fertilizer.

(7) Granulating and drying

The mixture D is sent to a granulator for granulation, and then screened by a screening machine to obtain particles with a particle size of 4-6 millimeters, and then the particles are sent to a microwave dryer with a microwave power of 80 kilowatts and dried at a temperature of 110° C. for 15-25 minutes to obtain the polymeric salt-tolerant and water-retaining fertilizer.

The above-mentioned polymeric salt-tolerant and water-retaining fertilizer is tested for wheat growth and development, and the equivalent common blended fertilizer ($N—P_2O_5—K_2O$ is 24-13-6, and the total nutrient content is ≥55%) produced by regular manufacturers in the market is selected as the control treatment. The experimental site is the experimental base of Qingdao Agricultural University (N37° 0'27.24", E119° 22'15.79"), where the organic matter content is 0.75%, the pH is 7.98, the salt content is 3.11 g/kg, the alkali-hydrolyzable nitrogen content is 141.05 mg/kg, and the available phosphorus content is 20.2 mg/kg, and the available potassium content is 322 mg/kg. Taimai 198, a wheat variety, is selected as the experimental material. Two groups of treatments are set up, CK (equivalent common blended fertilizer) is 50 kg/667m$^2$, T1 (polymeric water-retaining and salt-tolerant fertilizer) is 20.8 kg/667m$^2$, and the plot area is 45 m$^2$, which is repeated for three times. All fertilizers were applied as base fertilizer at one time. Soil water content and chlorophyll content were measured on May 5, May 16 and May 27, 2021, respectively. Wheat yield was measured on June 14th. The soil moisture content is measured by drying method by drilling 0-40 cm soil sample with soil; the chlorophyll content is determined by SPAD-502 chlorophyll meter.

TABLE 7

Soil water content of wheat under different Treatments (%)

| Treat- | May 5 | | May 16 | | May 27 | |
|---|---|---|---|---|---|---|
| ment | 0-20 cm | 20-40 cm | 0-20 cm | 20-40 cm | 0-20 cm | 20-40 cm |
| CK | 10.21 | 12.58 | 7.63 | 9.35 | 10.89 | 12.39 |
| T1 | 12.52 | 14.23 | 9.26 | 11.07 | 12.63 | 14.06 |

From Table 7, it can be seen that under the same cost, using the polymeric water-retaining and salt-tolerant fertilizer may maintain higher soil moisture content than using the common blended fertilizer, which is beneficial to the wheat growth.

TABLE 8

Chlorophyll content (SPAD value) of wheat leaves under different treatments

| Treatment | May 5 | May 16 | May 27 |
|---|---|---|---|
| CK | 52.9 | 49.8 | 33.2 |
| T1 | 60.6 | 58.1 | 41.8 |

From Table 8, it can be seen that under the same cost, using the polymeric water-retaining and salt-tolerant fertilizer may maintain higher chlorophyll content of leaves than using the common blended fertilizer, which is beneficial to the photosynthesis and nutrient accumulation of the wheats.

TABLE 9

Components and Yield of Wheat under Different Treatments

| Treatment | Panicle number (plant/667 m$^2$) | Number of grains per panicle (piece/panicle) | Thousand seed weight (g) | Yield (kg/667 m$^2$) |
|---|---|---|---|---|
| CK | 32.15 | 39.41 | 39.78 | 428.42 |
| T1 | 31.98 | 40.96 | 41.25 | 459.28 |

From the final yield results, the number of grains per panicle and thousand seed weight of the wheat treated with polymeric water-retaining and salt-tolerant fertilizer are higher than those treated with the common blended fertilizer. The yield of wheat treated with polymeric water-retaining and salt-tolerant fertilizer is 459.28 kg/667m$^2$, which is 7.2% higher than that of the control (428.42 kg/667m$^2$) using the common blended fertilizer, so the polymeric water-retaining and salt-tolerant fertilizer provided by the application is able to promote the high yield.

The above-mentioned embodiments only describe the preferred mode of the application, and do not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A polymeric salt-tolerant and water-retaining fertilizer, comprising following raw materials in parts by weight:

4465-5880 parts of fertilizers, 2292-3563 parts of water-retaining agents and 850-2850 parts of clays;

wherein the water-retaining agent comprises following raw materials in parts by weight:

1000-1500 parts of polyacrylamide, 400-600 parts of methylallyl polyoxyethylene ether, 300-450 parts of 2-acrylamide-2-methylpropanesulfonic acid, 100-200 parts of carboxymethyl cellulose, 40-60 parts of ammonium persulfate, 2-3 parts of N, N'-methylene bisacrylamide, 300-500 parts of montmorillonite and 150-250 parts of kaolin.

2. The polymeric salt-tolerant and water-retaining fertilizer according to claim 1, wherein the fertilizer comprises following raw materials in parts by weight:

1000-1200 parts of urea, 800-1000 parts of diammonium phosphate, 500-700 parts of potassium sulfate, 1000-1200 parts of ammonium sulfate, 350-500 parts of potassium dihydrogen phosphate, 500-750 parts of potassium humate, 5-10 parts of zinc sulfate, 300-500 parts of biochar and 10-20 parts of borax.

3. A preparation method of polymeric salt-tolerant and water-retaining fertilizer comprising following raw materials in parts by weight: 4465-5880 parts of fertilizers, 2292-3563 parts of water-retaining agents and 850-2850 parts of clays;

wherein the fertilizer comprises following raw materials in parts by weight:

1000-1200 parts of urea, 800-1000 parts of diammonium phosphate, 500-700 parts of potassium sulfate, 1000-1200 parts of ammonium sulfate, 350-500 parts of potassium dihydrogen phosphate, 500-750 parts of potassium humate, 5-10 parts of zinc sulfate, 300-500 parts of biochar and 10-20 parts of borax;

wherein the water-retaining agent comprises following raw materials in parts by weight: 1000-1500 parts of polyacrylamide, 400-600 parts of methylallyl polyoxyethylene ether, 300-450 parts of 2-acrylamide-2-methylpropanesulfonic acid, 100-200 parts of carboxymethyl cellulose, 40-60 parts of ammonium persulfate, 2-3 parts of N, N'-methylene bisacrylamide, 300-500 parts of montmorillonite and 150-250 parts of kaolin, comprising following steps:

S1, mixing the urea, the diammonium phosphate, the potassium sulfate, the ammonium sulfate, the potassium dihydrogen phosphate, the potassium humate, the zinc sulfate, the biochar and the borax, adding water, and stirring for dissolving to obtain a mixture A;

S2, sieving the montmorillonite and the kaolin with a 400-mesh sieve, adding the water, fully stirring, adding the carboxymethyl cellulose, and performing an ultrasonic dispersion to obtain a soil colloid;

S3, fully stirring the polyacrylamide, the methylallyl polyoxyethylene ether and the 2-acrylamide-2-methylpropanesulfonic acid, and adding the water for dissolving, then mixing with the soil colloid obtained in the S2, and carrying out the ultrasonic dispersion again to obtain a dispersion liquid; and S4, respectively adding ammonium persulfate dispersion and N, N'-methylene bisacrylamide solution into the dispersion liquid obtained in the S3 in a nitrogen environment, uniformly stirring at 60° C., adding the mixture A obtained in the S1, adding the clay to obtain a mixture B, then adding the water into the mixture B, uniformly stirring, granulating and drying to obtain the polymeric salt-tolerant and water-retaining fertilizer.

4. The preparation method of polymeric salt-tolerant and water-retaining fertilizer according to claim 3, wherein a mass ratio of a total amount of the urea, the diammonium phosphate, the potassium sulfate, the ammonium sulfate, the potassium dihydrogen phosphate, the potassium humate, the zinc sulfate, the biochar and the borax to the water in the S1 is 1: (1.5-2).

5. The preparation method of polymeric salt-tolerant and water-retaining fertilizer according to claim 3, wherein a mass ratio of the montmorillonite and the kaolin in the S2 is 2:1, and a mass ratio of a total amount of the montmorillonite and the kaolin to the water is 1: (6-9).

6. The preparation method of a polymeric salt-tolerant and water-retaining fertilizer according to claim 3, wherein a mass ratio of the polyacrylamide, the methylallyl polyoxyethylene ether and the 2-acrylamide-2-methylpropanesulfonic acid in the S3 is 10:4:3, and a mass ratio of a total amount of the polyacrylamide, the methylallyl polyoxyethylene ether and the 2-acrylamide-2-methylpropanesulfonic acid to the water is 1: (6-9).

7. The preparation method of polymeric salt-tolerant and water-retaining fertilizer according to claim 3, wherein a mass ratio of the ammonium persulfate to the water in the ammonium dispersion in the S4 is 1: (6-9); and a mass ratio of the N, N'-methylene bisacrylamide to the water in the N, N'-methylene bisacrylamide solution is 1: (6-9).

8. The preparation method of polymeric salt-tolerant and water-retaining fertilizer according to claim 3, wherein a mass ratio of the mixture B to the water in the S4 is 1: (1-3).

9. The preparation method of polymeric salt-tolerant and water-retaining fertilizer according to claim 3, wherein a particle size of the granulating in the S4 is 4-6 millimeters.

10. The preparation method of polymeric salt-tolerant and water-retaining fertilizer according to claim 3, wherein the drying in the S4 is a microwave drying; a microwave power is 75-90 kilowatts; a drying temperature is 105-130° C.; and a drying duration is 15-25 minutes.

* * * * *